United States Patent [19]
DeVilbiss et al.

[11] Patent Number: 5,689,957
[45] Date of Patent: Nov. 25, 1997

[54] TEMPERATURE CONTROLLER FOR LOW VOLTAGE THERMOELECTRIC COOLING OR WARMING BOXES AND METHOD THEREFOR

[75] Inventors: Roger S. DeVilbiss, Dallas, Tex.; Harry C. Powell, Shipman, Va.

[73] Assignee: Thermotek, Inc., Carrollton, Tex.

[21] Appl. No.: 682,840

[22] Filed: Jul. 12, 1996

[51] Int. Cl.⁶ .................................... F25B 21/02
[52] U.S. Cl. ........................... 62/3.7; 62/159
[58] Field of Search ............... 62/3.7, 3.2, 190, 62/159; 165/324.2, 58

[56] References Cited

U.S. PATENT DOCUMENTS

| | | | |
|---|---|---|---|
| 2,416,152 | 2/1947 | Braun | 165/185 |
| 2,713,655 | 7/1955 | Grubman | 165/185 |
| 3,111,008 | 11/1963 | Nelson | 62/3.3 |
| 3,584,291 | 6/1971 | Bunick et al. | 323/236 |
| 3,612,970 | 10/1971 | Sofan | 318/721 |
| 3,967,627 | 7/1976 | Brown | 128/400 |
| 4,187,535 | 2/1980 | Wigley et al. | 363/16 |
| 4,293,762 | 10/1981 | Ogawa | 219/302 |
| 4,301,658 | 11/1981 | Reed | 62/3.7 X |
| 4,338,944 | 7/1982 | Arkans | 128/400 |
| 4,382,222 | 5/1983 | Kurz et al. | 320/61 |
| 4,459,468 | 7/1984 | Bailey | 219/490 |
| 4,476,685 | 10/1984 | Aid | 62/3 |
| 4,494,380 | 1/1985 | Cross | 62/3 |
| 4,564,800 | 1/1986 | Jurjans | 320/36 |
| 4,587,563 | 5/1986 | Bendell et al. | 358/213 |
| 4,680,445 | 7/1987 | Ogawa | 219/299 |
| 4,833,888 | 5/1989 | Kerner et al. | 62/3.3 |
| 4,838,032 | 6/1989 | Maslaney et al. | 62/3.7 |
| 4,844,072 | 7/1989 | French et al. | 128/400 |
| 4,919,134 | 4/1990 | Streeter | 128/400 |
| 4,935,864 | 6/1990 | Schmidt et al. | 363/141 |
| 4,962,761 | 10/1990 | Golden | 128/400 |
| 5,030,898 | 7/1991 | Hokanson et al. | 318/146 |
| 5,035,052 | 7/1991 | Suzuki et al. | 29/890.046 |
| 5,043,560 | 8/1991 | Masreliez | 219/497 |
| 5,097,829 | 3/1992 | Quisenberry | 128/400 |
| 5,128,517 | 7/1992 | Bailey et al. | 219/506 |
| 5,128,854 | 7/1992 | Raets | 363/89 |
| 5,172,689 | 12/1992 | Wright | 128/400 |
| 5,174,121 | 12/1992 | Miller | 62/3.7 |
| 5,190,032 | 3/1993 | Zacol | 128/400 |
| 5,197,294 | 3/1993 | Galvan et al. | 62/3.62 |
| 5,213,152 | 5/1993 | Cox | 165/5 |
| 5,266,881 | 11/1993 | Hoffman et al. | 320/21 |
| 5,302,858 | 4/1994 | Folts | 307/66 |
| 5,371,665 | 12/1994 | Quisenberry et al. | 363/89 |
| 5,450,727 | 9/1995 | Ramirez et al. | 62/3.7 |
| 5,528,485 | 6/1996 | DeVilbiss et al. | 363/89 |
| 5,561,981 | 10/1996 | Quisenberry et al. | 62/3.7 |

FOREIGN PATENT DOCUMENTS

| | | |
|---|---|---|
| 2417974 | 10/1979 | France. |
| 4036210 | 5/1992 | Germany. |
| 188855 | 11/1982 | Japan. |

*Primary Examiner*—William Doerrler
*Attorney, Agent, or Firm*—Jenkens & Gilchrist

[57] ABSTRACT

A control system for a thermoelectric device to maintain the temperature in a storage compartment at a set point. The system includes input terminals for receiving a DC voltage and output terminals for connecting to the thermoelectric device. First and second switches are provided and coupled to the terminals for connection when enabled by the application of the DC voltage. The system further includes a first diode network connected between the first and second switches and enabling the second switch when the first diode network is enabled; a coupling device operatively connected to the first diode network to enable the first diode network when the coupling device is enabled; a sensor device providing an output indicative of the temperature in the storage compartment; a programmable control device receiving the output from the sensor device and providing an output to the coupling device to enable the coupling device, the output from the programmable control device being determined by the amount of deviation of the sensed temperature in the storage compartment from the set point temperature.

18 Claims, 2 Drawing Sheets

TEMPERATURE CONTROLLER FOR LOW VOLTAGE THERMOELECTRIC COOLING OR WARMING BOXES AND METHOD THEREFOR

BACKGROUND OF THE INVENTION

1. Field of the Invention

The present invention relates to thermoelectric cooling devices, and more particularly, but not by way of limitation, to control circuitry incorporating an improved design for temperature control of low voltage thermoelectric devices used in low voltage cooling or warming boxes.

2. History of the Prior Art

The development of thermoelectric cooling (TEC) devices has revolutionized the cooling industry. Conventional cooling has typically required the expansion and compression of gases, such as Chloroflorocarbons (CFC's) and Hydrochloroflorocarbons (HCFC's) to effect the absorption of heat for lowering the temperature of a fluid flowing in association therewith. Unfortunately, these substances are damaging to the earth's ozone layer and are being phased out in future years. The development of solid state cooling systems in the form of TEC devices, has permitted small commercial packages to be developed that are capable of precise temperature control in a variety of applications where environmental concern, size, weight, performance, and noise are at issue.

The most typical TEC device incorporates a thermoelectric module/component that utilizes electrical current to absorb heat from one side of the module and dissipate the heat on the opposite side. If the current direction is reversed, so is the heat pumping. Generally, cold sides and hot sides are developed necessitating an effective means of removing or adding heat from or to a solid, liquid or a gas (typically air).

Thermoelectric (TEC) devices have found uses in the field of medicine in the treatment of injured areas of the human body as an aid in the healing process. An example of such an application of a TEC device is seen in U.S. Pat. No. 5,097,829 for a temperature controlled cooling system. In this patent, the advantages of medically therapeutic cooling of a wound site on a body are discussed. Initial use of cooling therapy was mainly found in the field of orthopedics. It is now found that post surgical cooling is highly beneficial in the reduction of trauma to the patient. It also increases the rate of healing and reduces the length of a hospital stay. In addition, cooling therapy is also being used in home health care for chronic pain control and to increase joint flexibility and facilitate the rate of healing.

One of the newer uses of thermoelectric (TEC) devices is in the recreation field of camping/trailing where ice and/or 120 volt AC is not readily available. Portable TEC cooler/warmer units or boxes are available which simply plug into any 12 volt DC cigarette lighter receptacle and can operate on 120 volt AC when using an approved adapter unit. The portable TEC cooler/warmer unit or box will cool to approximately 40 degrees F below the external temperature or will warm to approximately 140 degrees F when the polarity of the applied power is reversed. Units are available, for example, having capacities from 7 quart to 36 quart. Temperature control is not, however, adequately addressed in such prior art systems.

It would be advantageous, therefore, to improve the temperature control of the portable TEC cooler/warmer units or boxes while reducing the number of parts, improving reliability and reducing the cost of providing improved temperature control. The present invention provides such an improvement over the prior art by providing improved temperature control while reducing power consumption of the thermoelectric devices at a lower cost of manufacture by using a minimal number of less expensive components.

SUMMARY OF THE INVENTION

The present invention relates to thermoelectric cooling devices. More particularly, one aspect of the present invention thus comprises a control system for a thermoelectric device to maintain the temperature in a storage compartment at a set temperature at a lower cost of manufacture by using a minimal number of less expensive components.

In yet another aspect, the present invention comprises an improved control system for a thermoelectric device for cooling or heating dependent upon the polarity of the DC voltage applied to the input of the control system while using Pulse Width Modulation of the power applied to the thermoelectric device.

In a further aspect, the present invention comprises two switch means which control the application of power to the thermoelectric device. One switch means is enabled continuously while the other switch means is pulse width modulated to apply power to the thermoelectric device.

Another aspect of the present invention comprises a control system for a thermoelectric device to maintain the temperature in a storage compartment at a set point which system includes a pair of input terminals for receiving a DC voltage thereacross; a pair of output terminals for connecting to the thermoelectric device; a first switch device connected between one terminal of the pair of input terminals and one terminal of the pair of output terminals and connecting the one terminals when enabled by the application of the DC voltage to the pair of input terminals; a second switch device connected between the other terminal of the pair of input terminals and the other terminal of the pair of output terminals and connecting the other terminals when the second switch means is enabled; a first diode network connected between the first and second switch devices and enabling the second switch device when the first diode network is enabled; a coupling device operatively connected to the first diode network to enable the first diode network when the coupling device is enabled; a sensor device providing an output indicative of the temperature in the storage compartment; a programmable control device receiving the output from the sensor device and providing an output to the coupling device to enable the coupling device, the output from the programmable control device being determined by the amount of deviation of the sensed temperature in the storage compartment from the set point temperature.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
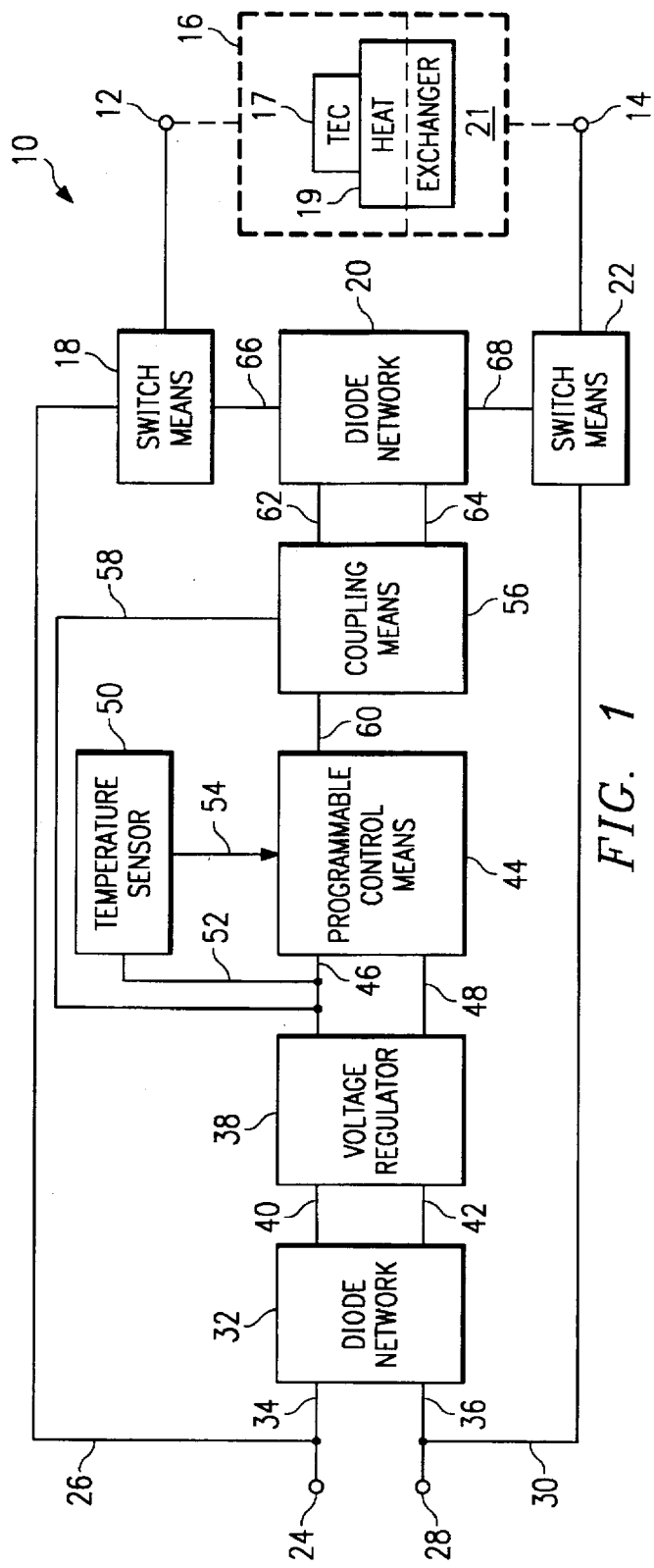
FIG. 1 is a block diagram of the inventive control circuitry operatively connected to a thermoelectric assembly.

Referring now to the drawings, and in particular to FIG 1, there is shown in block diagram form, a control circuit according to the present invention which is referred to generally by the reference numeral 10. Control circuit 10 is shown operatively connected at a pair of output terminals 12 and 14 to a thermoelectric assembly 16 comprising a predetermined number and circuit configuration (series, parallel or a combination of series/parallel) of TEC devices 17 and a heat exchanger 19 which is operatively positioned with a portion thereof in the storage compartment 21 of a portable TEC cooler/warmer unit or box. As is normal in a thermoelectric assembly, the one or more TEC devices will be positioned or sandwiched between two heat exchangers or between two halves of a heat exchanger.

Switch means 18, diode network 20 and switch means 22 are connected in series across output terminals 12 and 14. Switch means 18 is also connected to input terminal 24 via lead 26 and switch means 22 is also connected to input terminal 28 via lead 30. Input terminals 24 and 28 are also connected to the input of diode network 32 by leads 34 and 36, respectively. The output of diode network 32 is input to voltage regulator 38 via leads 40 and 42. The output of voltage regulator 38 is input to programmable control means 44 via leads 46 and 48 and is input to coupling means 56 via lead 58. Temperature sensor 50 receives a voltage from voltage regulator 38 via lead 52. Temperature sensor 50 may be positioned either in the storage compartment 21 in the portable thermoelectric cooler/warmer unit or box which is to be either cooled or heated or be positioned on the portion of the heat exchanger which resides in the storage compartment 21 in the unit or box which is to be either cooled or heated. Programmable control means 44 receives an input signal from temperature sensor 50 via lead 54. Programmable control means 44 comprises a microprocessor and appropriate software (such as a PID control loop) and provides an output to coupling means 56 via lead 60. It will be appreciated that the signal from temperature sensor 50 is indicative of the temperature where the temperature sensor 50 is located. Coupling means 56 provides a connection (when activated) to diode network 20 via leads 62 and 64.

Whether the air in the storage compartment 21 in the portable TEC cooler/warmer unit or box is going to be cooled or heated depends upon the polarity of the DC voltage which is applied to input terminals 24 and 28. In the preferred embodiment, if the positive polarity is applied to input terminal 24 and the negative polarity is applied to input terminal 28, then the air in the storage compartment 21 in the unit or box will be cooled by the thermoelectric assembly 16 as the thermoelectric assembly 16 is controlled by control circuit 10. If the positive polarity is applied to input terminal 28 and the negative polarity is applied to input terminal 24, then the air in the storage compartment 21 in the unit or box will be heated by the thermoelectric assembly 16 as the thermoelectric assembly 16 is controlled by control circuit 10.

In one planned use of this particular embodiment in the portable thermoelectric cooler/warmer units or boxes, the DC voltage available will be tweleve volts but the operation of the present invention is not limited to this value. The value of the DC voltage is determined by the number and circuit configuration (series, parallel or a combination of series/parallel) of the one or more TEC devices.

In the operation of the present invention for cooling the air in the storage compartment 21 in the unit or box, the twelve volts DC voltage is applied to input terminals 24 and 28 with the positive polarity of the voltage being applied to input terminal 24. Upon applying power to the input terminals 24 and 28, diode network 32 applies twelve volts DC to voltage regulator 38 with the plus polarity on lead 40. Voltage regulator 38 applies a regulated five volts DC to the programmable control means 44 with the plus polarity on lead 46. Regulated five volts DC is also applied to temperature sensor 50 via lead 52 and to coupling means 56 via lead 58. The programmable control means 44 reads the signal on lead 54 from the temperature sensor 50. The programmable control means 44 will determine the amount and direction of deviation of the sensed temperature from the desired set point temperature programmed into the software in the programmable control means 44. Assuming that this is the initial application of power to a warm cooler, the programmable control means 44 will determine that full power must be applied to the one or more TEC devices 17 until the temperature of the air in the storage compartment 21 in the unit or box nears the set point temperature. Therefore, the programmable control means 44 will provide an output on lead 60 to coupling means 56 which provides a connection, to diode network 20 via leads 62 and 64, which allows a connection between leads 66 and 68.

Figure 3:
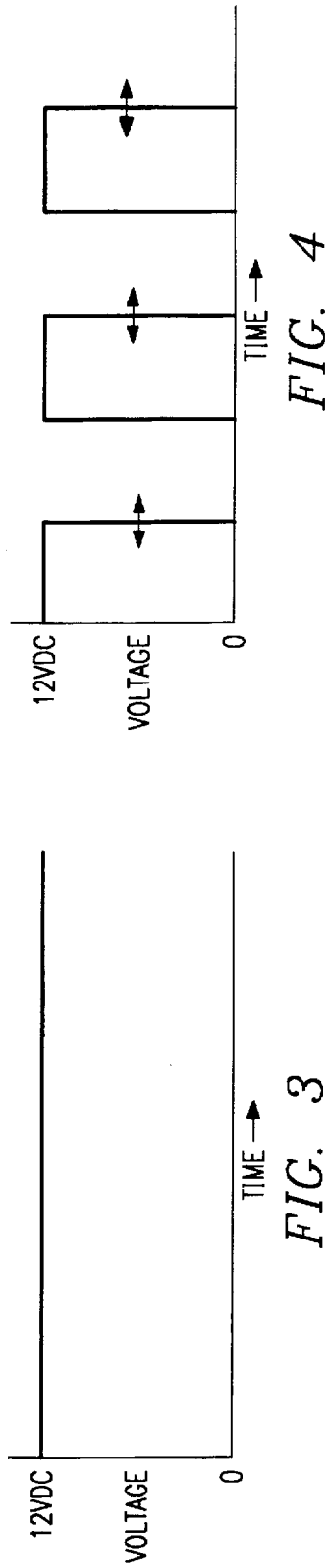
FIG. 3 is a view of the waveform of the voltage initially applied to the thermoelectric assembly.

In the meantime, the plus twelve volts DC applied to lead 26 activates switch means 18 which provides a connection between lead 26 and output terminal 12 to apply plus twelve volts DC to output terminal 12 and provides plus twelve volts DC to diode network 20 via lead 66. Plus twelve volts DC is provided to switch means 22, through diode network 20 and lead 68, which completes the circuit to lead 30 and activates switch means 22. Switch means 22 provides a connection between lead 30 and output terminal 14 to complete the circuit to thermoelectric assembly 16 and provide twelve volts DC to the one or more TEC devices 17 in the thermoelectric assembly 16, the waveform of which is shown in FIG. 3. The one or more TEC devices 17 will be placed in the "ON" or conducting condition and current will flow through the one or more TEC devices to bring the temperature of the air in the storage compartment 21 in the portable TEC cooler/warmer unit or box down to the "set point" temperature.

Figure 4:
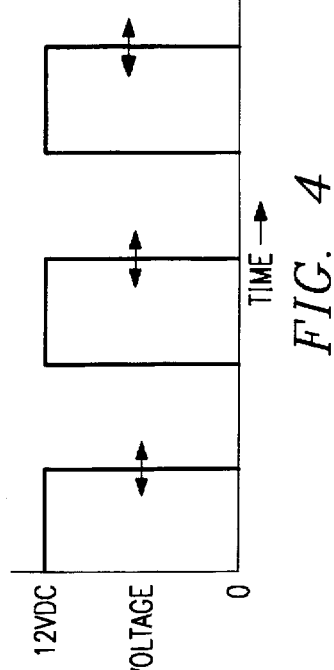
FIG. 4 is a view of the waveform of the voltage applied to the thermoelectric assembly during operation thereof after initialization.

As previously noted, programmable control means 44 will maintain an output to coupling means 56 which will result in switch means 22 maintaining the connection for power to be applied to the one or more TEC devices 17 in thermoelectric assembly 16 as shown in FIG. 3. With power being applied to the one or more TEC devices 17, the temperature of the air in the storage compartment 21 in the portable TEC cooler/warmer unit or box will decrease toward the desired programmed or set point value. Upon passing below or overshooting the desired temperature, the output from the programmable control means 44 will be discontinued and in the "OFF" condition which results in switch means 22 disconnecting lead 30 from output terminal 14 and placing the one or more TEC devices in thermoelectric assembly 16 in the "OFF" condition until the temperature of the air in the storage compartment 21 in the unit or box increases or overshoots the desired programmed or set point value. It will be appreciated that the programmable control means 44 is providing a Pulse Width Modulation (PWM) output to control the connection of lead 30 to output terminal 14 (through coupling means 56, diode network 20 and switch means 22) and the application of power to the one or more TEC devices 17 in the thermoelectric assembly 16 as shown in FIG. 4. This hunting process will continue for a short period until settling in on the value of applied power which maintains the temperature of the air in the storage compartment 21 in the portable TEC cooler/warmer unit or box at or near the desired set point value. It will be appreciated that lead 26 remains connected to output terminal 12 through switch means 18 during the PWM control and application of power to the one or more TEC devices 17 in the thermoelectric assembly 16 through switch means 22.

In operation of the present invention for heating the air in the storage compartment 21 in the unit or box, the twelve volts DC voltage is applied to input terminals 24 and 28 with the positive polarity of the voltage being applied to input terminal 28. Upon applying power to the input terminals 24 and 28, diode network 32 again applies twelve volts DC to voltage regulator 38 with the plus polarity on lead 40. Voltage regulator 38 applies a regulated five volts DC to the programmable control means 44 with the plus polarity on lead 46. Regulated five volts DC is also applied to temperature sensor 50 via lead 52 and to coupling means 56 via lead 58. The programmable control means 44 reads the signal on lead 54 from the temperature sensor 50. The programmable control means 44 will determine the amount and direction of deviation of the sensed temperature from the desired set point temperature programmed into the software in the programmable control means 44. Assuming that this is the initial application of power to an unheated cooler/warmer unit or box, the programmable control means 44 will determine that full power must be applied to the one or more TEC devices until the temperature of the air in the storage compartment 21 in the unit or box nears the set point temperature. Therefore, the programmable control means 44 will provide an output on lead 60 to coupling means 56 which provides a connection, to diode network 20 via leads 62 and 64, which allows a connection between leads 66 and 68.

In the meantime, the plus twelve volts DC applied to lead 30 activates second switch means 22 which provides a connection between lead 30 and output terminal 14 to apply plus twelve volts DC to output terminal 14 and provides plus twelve volts DC to diode network 20 via lead 68. Plus twelve volts DC is provided to switch means 18, through diode network 20 and lead 66, which completes the circuit to lead 26 and activates switch means 18. Switch means 18 provides a connection between lead 26 and output terminal 12 to complete the circuit to thermoelectric assembly 16 and provide twelve volts DC to the one or more TEC devices 17 in the thermoelectric assembly 16, the waveform of which is shown in FIG. 3. The one or more TEC devices 17 will be placed in the "ON" or conducting condition and current will flow through the one or more TEC devices to bring the temperature of the air in the storage compartment 21 in the portable TEC cooler/warmer unit or box up to the "set point" temperature.

As previously noted, programmable control means 44 will maintain an output to coupling means 56 which will result in switch means 18 maintaining the connection for power to be applied to the one or more TEC devices 17 in thermoelectric assembly 16 as shown in FIG. 3. With power being applied to the one or more TEC devices 17, the temperature of the air in the storage compartment 21 in the portable TEC cooler/warmer unit or box will increase toward the desired programmed or set point value. Upon passing above or overshooting the desired temperature, the output from the programmable control means 44 will be discontinued and in the "OFF" condition which results in switch means 18 disconnecting lead 26 from output terminal 12 and placing the one or more TEC devices 17 in thermoelectric assembly 16 in the "OFF" condition until the temperature of the air in the storage compartment 21 in the unit or box decreases or overshoots the desired programmed or set point value. It will be appreciated that the programmable control means 44 is providing a Pulse Width Modulation (PWM) output to control the connection of lead 26 to output terminal 12 (through coupling means 56, diode network 20 and switch means 18) and the application of power to the one or more TEC devices 17 in the thermoelectric assembly 16 as shown in FIG. 4. This hunting process will continue for a short period until settling in on the value of applied power which maintains the temperature of the air in the storage compartment 21 in the portable TEC cooler/warmer unit or box at or near the desired set point value. It will be appreciated that lead 30 remains connected to output terminal 14 through switch means 22 during the PWM control and application of power to the one or more TEC devices 17 in the thermoelectric assembly 16 through switch means 18.

It will be appreciated that when the portable TEC cooler/warmer unit or box is being used in the cooling mode, the input voltage is connected with the positive polarity connected to input terminal 24. In the cooling mode, switch means 18 is on continuously and lead 26 is connected to output terminal 12. Switch means 22 and the connection of lead 30 to output terminal 14 are Pulse Width Modulated and the shorter the time of current flow, the higher the frequency of the PWM type signal and the longer the time of current flow, the lower the frequency of the PWM type signal.

It will be appreciated that when the portable TEC cooler/warmer unit or box is being used in the warming or heating mode, the input voltage is connected with the positive polarity connected to input terminal 28. In the warming or heating mode, switch means 22 is on continuously and lead 30 is continuously connected to output terminal 14. Switch means 18 and the connection of lead 26 to output terminal 12 are Pulse Width Modulated and the shorter the time of current flow, the higher the frequency of the PWM type signal and the longer the time of current flow, the lower the frequency of the PWM type signal.

It will be appreciated that the application of the twelve volts DC to the input terminals 24 and 28 may be accomplished by providing a plug and socket which places the positive polarity of the twelve volts DC on input terminal 24 when the plug is inserted into the socket in one position or orientation and which places the positive polarity of the twelve volts DC on input terminal 28 when the plug is inserted into the socket in a different position or orientation. Also, as another means of implementation, a double pole, double throw switch could be installed between input terminals 24 and 28 and the twelve volt DC source to allow the choice of cooling or heating.

Figure 2:
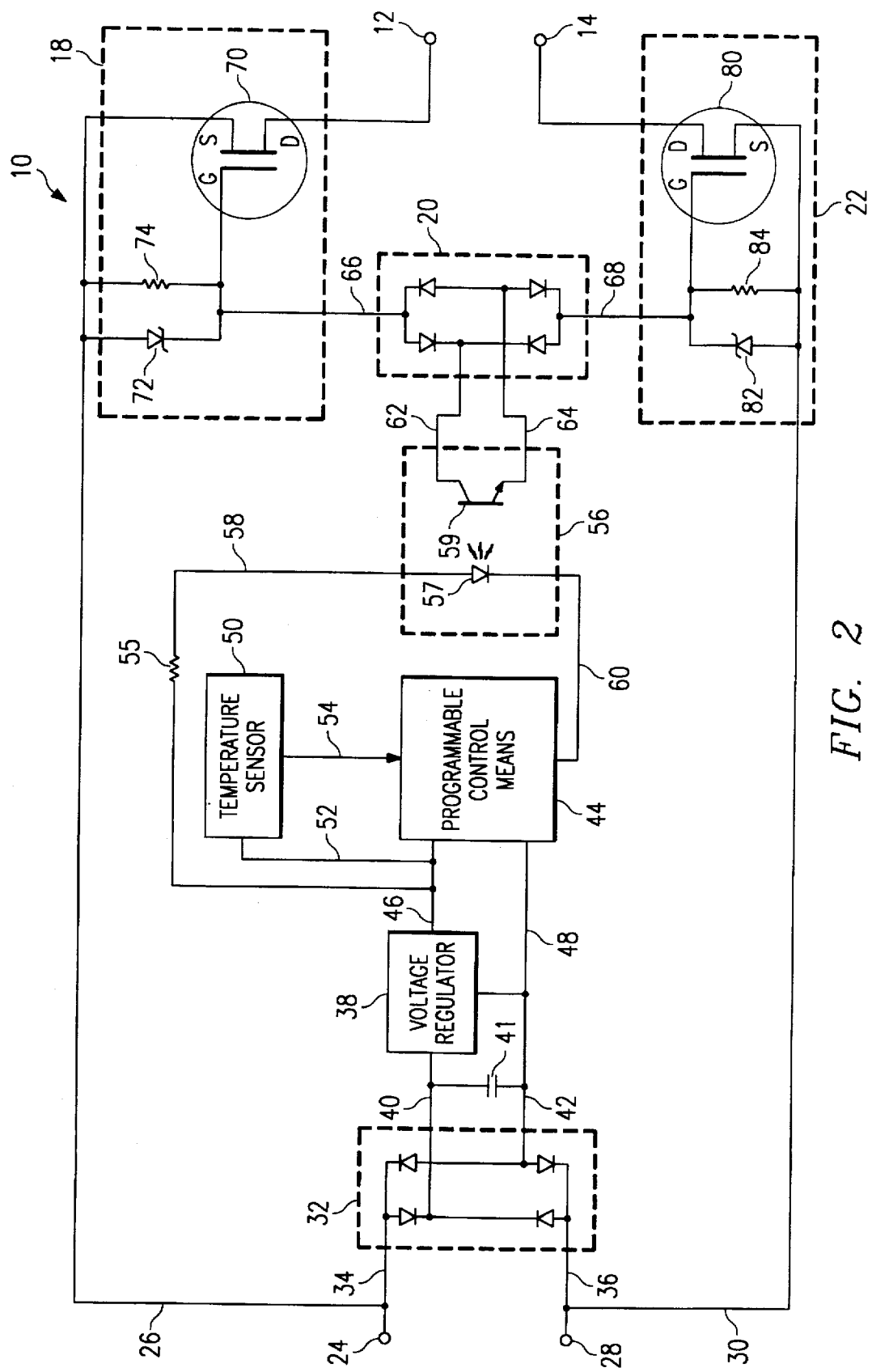
FIG. 2 is an electrical diagram of the control circuitry of the present invention.

Referring now to control circuit 10 as shown in FIG. 2, diode network 32 is connected to input terminals 24 and 28 and comprises four diodes which are connected in a bridge rectifier type configuration to assure that the plus polarity of the DC voltage, whether it is applied to input terminal 24 or input terminal 28, always appears on lead 40 to voltage regulator 38. Filter capacitor 41 is operatively connected between leads 40 and 42.

Temperature sensor 50, which receives a regulated plus five volts DC from voltage regulator 38 and provides a digital signal to programmable control means 44, comprises a digital temperature sensor.

Coupling means 56 comprises an opto-isolator which receives an output from voltage regulator 38 via lead 58 and resistor 55. The opto-isolator comprises an LED 57 and a phototransistor 59. When the LED 57 is activated by the programmable control means 44, phototransistor 59 provides continuity across leads 62 and 64 which are connected to diode network 20.

Diode network 20 is connected to leads 66 and 68 as well as to leads 62 and 64 and comprises four diodes which are connected in a bridge rectifier type configuration to assure that when phototransistor 59 provides continuity across leads 62 and 64, there will be continuity between leads 66 and 68 through diode network 20 and coupling means 56.

Switch means 18 comprises an FET 70 whose drain terminal is connected to output terminal 12. Source terminal is connected to lead 26 with a zener diode 72 and a resistor 74 connected in parallel between the source terminal and the gate terminal of FET 70.

Switch means 22 comprises an FET 80 whose drain terminal is connected to output terminal 14. Source terminal is connected to lead 30 with a zener diode 82 and a resistor 84 connected in parallel between the source terminal and the gate terminal of FET 80.

Further to the operation of the present invention, which was described above with reference to FIG. 1, when the DC voltage is applied to input terminals 24 and 28 (with the positive polarity applied to input terminal 24 for cooling purposes) diode network 32 applies the DC voltage to voltage regulator 38 with the plus polarity being applied on lead 40. Digital temperature sensor 50 provides a digital signal to the programmable control means 44 which is indicative of the temperature where the temperature sensor 50 is located. If the signal from the temperature sensor 50 indicates to the programmable control means 44 that power needs to be applied to the thermoelectric assembly 16 to bring the temperature down to the desired set point temperature, programmable control means 44 will complete the circuit through LED 57 via lead 60 which will result in diode network 20 and phototransistor 59 providing continuity between leads 66 and 68.

With the plus DC voltage being on lead 26, zener diode 72 places the plus DC voltage on lead 66 and the gate terminal of FET 70 which results in the provision of continuity between the source and drain terminals of FET 70 and places the plus DC voltage on output terminal 12. The plus DC voltage is also placed on lead 68 and the gate terminal of FET 80 through diode network 20 and phototransistor 59. FET 80 then provides continuity between the source and drain terminals of FET 80 and places the negative polarity of the DC voltage on output terminal 14 which results in the application on the DC voltage to the thermoelectric assembly 16.

As noted before, during the cooling operation, both switch means 18 and switch means 22 will remain in the "ON" condition until the digital signal from the temperature sensor 50 to the programmable control means 44 indicates that temperature of the air in the storage compartment 21 in the portable TEC cooler/warmer unit or box has passed below or overshot the set temperature. At this time, programmable control means 44 will begin the PWM control of placing switch means 22 in the "OFF" and "ON" conditions to maintain the temperature of the air in the storage compartment 21 in the portable TEC cooler/warmer unit or box at or near the desired set point value. Switch means 18 remains in the "ON" condition during this time.

For purposes of heating the air in the storage compartment 21 in the portable TEC cooler/warmer unit or box, as noted before, the plus polarity of the DC voltage is applied to input terminal 28. Diode network 32 applies the DC voltage to voltage regulator 38 with the plus polarity on lead 40. With the plus polarity of the DC voltage on lead 30 and on the gate terminal of FET 80 via zener diode 82, FET 80 provides continuity between the source and drain terminals and places the plus polarity of the DC voltage on output terminal 14. FET 70 connects lead 26 to output terminal 12 in the same manner that FET 80 connected lead 30 to output terminal 14 as discussed above during the cooling phase of operation.

As noted before, during the heating operation, both switch means 18 and switch means 22 will remain in the "ON" condition until the digital signal from the temperature sensor 50 to the programmable control means 44 indicates that the temperature of the air in the storage compartment 21 in the portable TEC cooler/warmer unit or box has passed above or overshot the set temperature. At this time, programmable control means 44 will begin the PWM control of placing switch means 18 in the "OFF" and "ON" conditions to maintain the temperature of the air in the storage compartment 21 in the portable TEC cooler/warmer unit or box at or near the desired set point value. Switch means 22 remains in the "ON" condition during this time.

From the foregoing detailed description, it can be appreciated that the present invention is capable of providing improved temperature control of portable TEC cooler/warmer units or boxes while reducing the number of parts, improving reliability and reducing the cost of providing improved temperature control. While particular embodiments of the present invention have been described, it will be appreciated by those skilled in the art that various modifications, alternatives, variations, etc., may be made without departing from the spirit and scope of the invention as defined in the appended claims.

What is claimed is:

1. A control system for a thermoelectric device to maintain the temperature in a storage compartment at a set point, said control system comprising:

a pair of input terminals for receiving a DC voltage thereacross;

a pair of output terminals for connecting to the thermoelectric device;

a first switch means operatively connected between one terminal of the pair of input terminals and one terminal of the pair of output terminals, said first switch means connecting said one terminal of the pair of input terminals to said one terminal of the pair of output terminals when enabled by the application of the DC voltage to said pair of input terminals with a predetermined polarity of the DC voltage being applied to said one terminal of the pair of input terminals;

a second switch means operatively connected between the other terminal of the pair of input terminals and the other terminal of the pair of output terminals, said second switch means connecting said other terminal of the pair of input terminals to said other terminal of the pair of output terminals when said second switch means is enabled;

a first diode network operatively connected between said first and second switch means for electrically connecting said first switch means and said second switch means and enabling said second switch means when said first diode network is enabled;

coupling means operatively connected to said first diode network to enable said first diode network when said coupling means is enabled;

sensor means providing an output indicative of the temperature in the storage compartment;

programmable control means receiving the output from said sensor means and providing an output to said coupling means to enable said coupling means, said output from said programmable control means being determined by the amount of deviation of the sensed temperature in the storage compartment from the set point temperature; and a second diode network operatively connected between said pair of input terminals and said programmable control means to provide the correct polarity of the DC voltage to said programmable control means regardless of which input terminal of the pair of input terminals is provided the plus polarity of the DC voltage.

2. The system as set forth in claim 1 further including a voltage regulator operatively connected between said second diode network and said programmable control means to supply a regulated DC voltage to said programmable control means when a DC voltage is applied across said pair of input terminals.

3. The system as set forth in claim 1 wherein said sensor means comprises a digital temperature sensor.

4. The system as set forth in claim 1 wherein said first diode network comprises four diodes connected in a bridge rectifier configuration.

5. The system as set forth in claim 1 wherein said second diode network comprises four diodes connected in a bridge rectifier configuration.

6. The system as set forth in claim 1 wherein said coupling means comprises an opto-isolator.

7. The system as set forth in claim 1 wherein said programmable control means comprises a microprocessor and associated software.

8. The system as set forth in claim 1 wherein said first switch means comprises an FET with a zener diode and a resistor connected in parallel between the source terminal and the gate terminal of the FET.

9. The system as set forth in claim 1 wherein said second switch means comprises an FET with a zener diode and a resistor connected in parallel between the source terminal and the gate terminal of the FET.

10. A method of controlling the application of power to a thermoelectric device to maintain the temperature in a storage compartment at a set point, said method comprising the steps of:

providing a pair of input terminals for receiving a DC voltage thereacross;

providing a pair of output terminals for connecting to the thermoelectric device;

providing a first switch means operatively connected between one terminal of the pair of input terminals and one terminal of the pair of output terminals, said first switch means connecting said one terminal of the pair of input terminals to said one terminal of the pair of output terminals when enabled by the application of the DC voltage to said pair of input terminals with a predetermined polarity of the DC voltage being applied to said one terminal of the pair of input terminals;

providing a second switch means operatively connected between the other terminal of the pair of input terminals and the other terminal of the pair of output terminals, said second switch means connecting said other terminal of the pair of input terminals to said other terminal of the pair of output terminals to activate the thermoelectric device for the length of time that said second switch means is enabled;

providing a first diode network operatively connected between said first and second switch means for electrically connecting said first switch means and said second switch means and enabling said second switch means when said first diode network is enabled;

providing coupling means operatively connected to said first diode network to enable said first diode network when said coupling means is enabled;

determining the temperature in the storage compartment; and providing programmable control means to receive an indication of the temperature in the storage compartment and providing an output to said coupling means to enable said coupling means, the length of time the output from said programmable control means is provided to said coupling means is determined by the amount of deviation of the temperature in the storage compartment from the set point temperature.

11. The method as set forth in claim 10 further including the step of providing a second diode network operatively connected between said pair of input terminals and said programmable control means to provide the correct polarity of the DC voltage to said programmable control means regardless of which input terminal of the pair of input terminals is provided the plus polarity of the DC voltage when the DC voltage is applied.

12. The method as set forth in claim 11 further including the step of providing a voltage regulator operatively connected between said second diode network and said programmable control means to supply a regulated DC voltage to said programmable control means when a DC voltage is applied across said pair of input terminals.

13. The method as set forth in claim 11 wherein said first diode network comprises four diodes connected in a bridge rectifier configuration.

14. The method as set forth in claim 11 wherein said second diode network comprises four diodes connected in a bridge rectifier configuration.

15. The method as set forth in claim 11 wherein said coupling means comprises an opto-isolator.

16. The method as set forth in claim 11 wherein said programmable control means comprises a microprocessor and associated software.

17. The method as set forth in claim 11 wherein said first switch means comprises an FET with a zener diode and a resistor connected in parallel between the source terminal and the gate terminal of the FET.

18. The method as set forth in claim 11 wherein said second switch means comprises an FET with a zener diode and a resistor connected in parallel between the source terminal and the gate terminal of the FET.

* * * * *